United States Patent
Cooley et al.

(10) Patent No.: US 8,214,839 B1
(45) Date of Patent: Jul. 3, 2012

(54) STREAMING DISTRIBUTION OF FILE DATA BASED ON PREDICTED NEED

(75) Inventors: Shaun Cooley, El Segundo, CA (US); Randall Richards Cook, Springville, UT (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 996 days.

(21) Appl. No.: 12/059,777

(22) Filed: Mar. 31, 2008

(51) Int. Cl.
*G06F 13/00* (2006.01)

(52) U.S. Cl. ........................................ 718/104; 709/232

(58) Field of Classification Search .................... 718/104
See application file for complete search history.

(56) References Cited

U.S. PATENT DOCUMENTS

| | | | |
|---|---|---|---|
| 5,404,505 A * | 4/1995 | Levinson | 348/E7.069 |
| 7,130,890 B1 * | 10/2006 | Kumar et al. | 709/218 |
| 7,181,523 B2 * | 2/2007 | Sim | 709/226 |
| 2003/0182439 A1 * | 9/2003 | Geshwind | 709/236 |
| 2004/0215746 A1 * | 10/2004 | McCanne et al. | 709/219 |
| 2006/0082809 A1 * | 4/2006 | Loukipoudis et al. | 358/1.15 |
| 2006/0106852 A1 * | 5/2006 | Siddall et al. | 707/101 |
| 2007/0055660 A1 * | 3/2007 | Anderson | 707/4 |

* cited by examiner

*Primary Examiner* — Eric Coleman
(74) *Attorney, Agent, or Firm* — Brill Law Office; Jeffrey Brill

(57) ABSTRACT

File resources that are most likely to be used on a target computer are proactively cached, so that the resources are available before they are needed. This greatly reduces or eliminates associated user wait times. It is determined which file resources are most likely to be used, the cost of transmitting them to the cache, the cost of storing them in the cache and the amount of cache space available. Based on a weighted balancing analysis of factors such as these, specific file resources are proactively streamed for use on the target computer. The determination as to which resources are most likely to be used can be based on a variety of factors, such as usage patterns, schedule based information, user and group based information, target computer and network information, etc.

18 Claims, 1 Drawing Sheet

STREAMING DISTRIBUTION OF FILE DATA BASED ON PREDICTED NEED

TECHNICAL FIELD

This invention pertains generally to application streaming technology and network file systems, and more specifically to streaming distribution of file data based on predicted need.

BACKGROUND

There are many scenarios in which a delay occurs before a user can begin a desired task on a computer, because file resources required for the task are not immediately available to the device. One example is when a user logs onto a networked computer for the first time, and specific applications, user data, and settings need to be downloaded from a central server for the user. Another example is where a single person uses multiple computers (e.g., a desktop and a laptop). When the user operates one of the computers (e.g., the desktop), the user's activity has effects such as changing data, creating and deleting files and modifying configuration settings. When the user next operates the other computer (e.g., the laptop), these modified file resources need to be copied to the other computer.

Application streaming provides the ability for an endpoint (e.g., a client computer) to run an application locally that is stored remotely, for example on a server. The server can transmit specific portions of the application as well as associated file resources to the endpoint, as the endpoint needs them. Commercial application streaming technology exists today.

A network file system is a computer file system that supports sharing of resources such as files, printers and/or persistent storage over a computer network. Network file systems such as Andrew File System (AFS), NetWare Core Protocol (NCP), and Server Message Block (SMB, also known as Common Internet File System (CIFS)) exist today. Network file systems can share files, including executable files, between servers and endpoints.

In a co-pending, commonly assigned patent application, the use of a local index of a set of file resources is disclosed, such that application streaming technology or network file systems can simulate local storage of the entire set of file resources. This is true even though some or all of the file resources are actually stored remotely. The streaming technology or the like can be used to transfer remotely stored file resources as needed, by using the index.

Returning to the scenario discussed above in which a single users runs both a desktop and a laptop, imagine that these computers are both used for the same work related tasks, and both use roaming profiles. A roaming profile, such as those provided by Central identity management software (e.g., Microsoft's Active Directory®) allows individual users to login to any computer in an enterprise network, and automatically have their personal settings copied to that computer. Thus, the user can experience the same computing environment on both computers. However, under such a scenario, a synchronization operation will need to occur every time the user logs into one of the computers, to copy the updated file resources to that computer. This synchronization can be time consuming, causing the delay discussed above. The use of the application streaming technology index solution can shorten the delay, but a delay still occurs.

It would be desirable to be able to provide relevant file resources to computing devices without experiencing these problems.

SUMMARY

File resources that are most likely to be used on a target computer are proactively cached, so that the resources are available before they are needed. This greatly reduces or eliminates associated user wait times. It is determined which file resources are most likely to be used, the cost of transmitting them to the cache, the cost of storing them in the cache and the amount of cache space available. Based on a weighted balancing analysis of factors such as these, specific file resources are proactively streamed for use on the target computer. The determination as to which resources are most likely to be used can be based on a variety of factors, such as usage patterns, schedule based information, user and group based information, target computer and network information, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
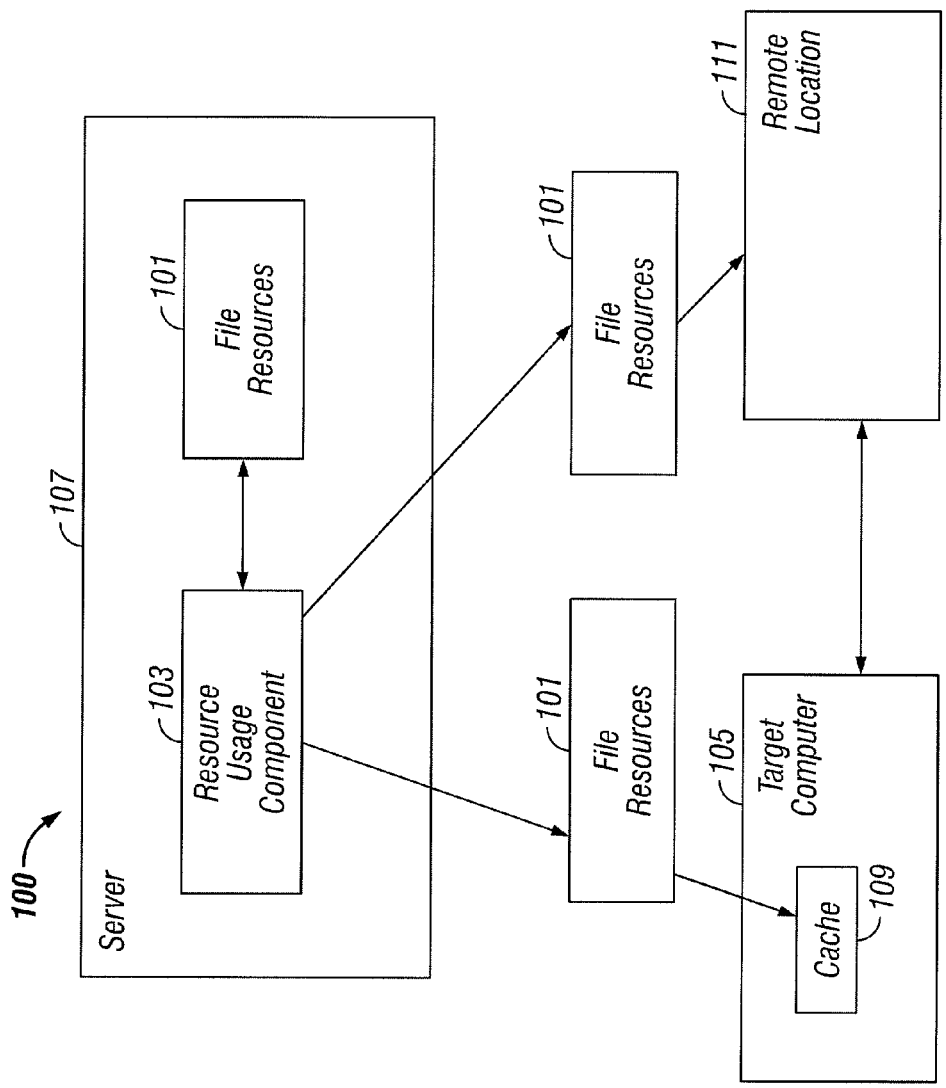
FIG. 1 is a block diagram illustrating streaming distribution of file data based on predicted need, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for streaming distribution of file data 101 based on predicted need, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a resource usage component 103 (running on, e.g., a server 107) determines the likelihood that certain file resources 101 will be utilized on a particular computing device 105, based on a variety of factors. The resource usage component 103 can analyze factors such as file resource 101 usage patterns, schedule based information, user accounts/user rights, group information, computing device 105 location, network information, etc. It is to be understood that such analysis concerning file resource 101 usage can be performed at a user level, group level, file level, application level, computing device 105 level, network level, etc. It is to be understood that what specific factors to analyze to determine which file resources are most likely to be utilized on a given computer 105 is a variable design parameter. The implementation mechanics of performing such analysis are known to those of ordinary skill in the relevant art, and the use thereof within the context of the present invention will be readily apparent to those of such a skill level in light of this specification.

Based on the above-described analysis, the resource usage component 103 can determine a file resource set most likely to be utilized on the target computer 105. This set of files 101 can comprise not only data associated with specific users, but also shared data, such as Application Virtualization Layers. As described in more detail below, shared data can be weighed differently than data associated with an individual user.

The resource usage component 103 pre-streams file resources 105 that are most likely to be used to a cache 109 on the target computer 105. It is to be understood that as used herein, the term "file resources" 105 is not limited to entire files, but can also comprise specific portions of files, which modern streaming systems are capable of transmitting. In some embodiments, the resource usage component 103 can also/instead move and/or copy some or all of these file resources 101 to a more desirable network location 111 other than the target computer 105 (because, e.g., the location 111 is faster or cheaper). By pre-streaming the files 101 most likely to be used to the cache 109, the delay experienced by the user can be greatly shortened or eliminated altogether.

In order to determine which file resources 101 from the set to pre-stream, the resource usage component 103 evaluates how likely each resource 101 is to be utilized, its size, and the available cache size. Thus, the determination is made based not only on how likely the resource 101 is to be used, but also the cost of caching it. The amount of available bandwidth and the cost of transmitting the resource 101 can also be taken into account. In some embodiments, in order to not have a negative impact on current users, the resource usage component 103 uses only a portion of available bandwidth, or only idle transport cycles, to stream the predictive file resource data 101.

As noted above, file resources 101 can also be treated at a group level. For example, suppose a given computer 105 is shared by two users, both of whom use Microsoft Office®, one of whom uses Adobe Creator®, and the other of whom uses Autocad®. The resource usage component 103 could determine, for example, that Microsoft Office® related resources 101 have priority for storage in the cache 109, because Microsoft Office® is utilized by both users. Suppose that after storing the Microsoft Office® related resources 101, there is not sufficient cache 109 space for all of the Creator and Autocad related resources 101. The resource usage component 103 could determine which Creator and/or Autocad resources 101 to cache based on, e.g., usage history, likelihood the associated user will be the next one to use the computer 105, size, etc. Individual users can also be given greater or lesser cache 109 priorities and associated amounts of cache 109 space, as desired.

It is to be understood that a balancing analysis is performed to determine which specific file resources 101 to stream. Which specific factors to include in the balancing analysis and how to weight the different factors is a variable design parameter. The implementation mechanics of performing the above-described balancing and weighing are known to those of ordinary skill in the relevant art, and the use thereof within the context of the present invention will be readily apparent to those of such a skill level in light of this specification. Based on the results of the (weighted) balancing, the resource usage component 103 can deliver some, all or none of the file resources 101 in the set, depending upon, e.g., how much cache 109 space is available, and the cost of the streaming operation.

In some embodiments, the resource usage component 103 updates its determinations of which file resources 101 are to be streamed to the cache 109, on a regular basis in real time, e.g., X times per Y period of time. In other words, the resource usage component 103 can re-determine which resources 101 are most likely to be used, etc., and proactively push resources 101 to users as various resources become more and less likely to be used over time. As the resource usage component 103 can make such determinations based on the actions of many users in the field, it can be very dynamic in nature, as it changes in synchronization with the latest usage trends.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for distributing file data to a target computer, the method comprising the steps of:
    determining a likelihood of use on a target computer for each of a plurality of file resources;
    determining a size of each of a plurality of file resources;
    determining an amount of available file resource storage space associated with the target computer;
    identifying available transmission bandwidth and idle transport cycles; and
    proactively transmitting at least one file resource to an endpoint, based on at least the likelihood of use of the at least one file resource, size of the at least one file resource and amount of available storage space, wherein proactively transmitting comprises using only a portion of available transmission bandwidth to transmit the at least one file resource to the endpoint and using only idle transport cycles to transmit the at least one file resource to the endpoint.

2. The method of claim 1 further comprising:
proactively transmitting a plurality of file resources to the endpoint.

3. The method of claim 1 further comprising:
dynamically updating at least the determined likelihood of use on the target computer for at least one of the plurality of file resources.

4. The method of claim 3 further comprising:
responsive to the updating step, proactively transmitting at least one additional file resource to the endpoint.

5. The method of claim 1 wherein determining the likelihood of use on the target computer for each of the plurality of file resources further comprises determining the likelihood of use of the at least one file resource on the target computer based on at least one factor from a group of factors consisting of:
file resource usage patterns;
schedule based information;
user accounts;
user rights;
group information;
target computer location;
network information;
user level analysis;
user group level analysis;
file resource level analysis;
application level analysis;
target computer level analysis;
computing device level analysis; and
network level analysis.

6. The method of claim 1 wherein proactively transmitting at least one file resource to the endpoint further comprises:
determining a set of file resources most likely to be used on the target computer; and
proactively transmitting at least a subset of the set of file resources to the endpoint, based on at least the likelihood of use of the at least one file resource, size of the at least one file resource and amount of available storage space.

7. The method of claim 1 wherein proactively transmitting at least one file resource to the endpoint further comprises:
proactively transmitting at least one file resource to an endpoint, based on the likelihood of use of the at least one file resource, cost of transmitting the at least one file resource and cost of storing the at least one file resource on the endpoint.

8. The method of claim 1 wherein proactively transmitting at least one file resource to the endpoint further comprises:
weighing available transmission bandwidth in determining which at least one file resource to transmit to the endpoint.

9. The method of claim 1 wherein proactively transmitting at least one file resource to the endpoint further comprises performing at least one step from a group of steps consisting of:
transmitting at least one file resource to the target computer for storage in a local cache; and
transmitting at least one file resource to a computing device other than the target computer, for access by the target computer.

10. At least one non-transitory computer readable medium containing a computer program product for distributing file data to a target computer, the computer program product comprising:
program code for determining a likelihood of use on a target computer for each of a plurality of file resources;
program code for determining a size of each of a plurality of file resources;
program code for determining an amount of available file resource storage space associated with the target computer;
program code for identifying available transmission bandwidth and idle transport cycles; and
program code for proactively transmitting at least one file resource to an endpoint, based on at least the likelihood of use of the at least one file resource, size of the at least one file resource and amount of available storage space, wherein proactively transmitting comprises using only a portion of available transmission bandwidth to transmit the at least one file resource to the endpoint and using only idle transport cycles to transmit the at least one file resource to the endpoint.

11. The computer program product of claim 10 further comprising:
program code for proactively transmitting a plurality of file resources to the endpoint.

12. The computer program product of claim 10 further comprising:
program code for dynamically updating at least the determined likelihood of use on the target computer for at least one of the plurality of file resources.

13. The computer program product of claim 12 further comprising:
program code for, responsive to the updating step, proactively transmitting at least one additional file resource to the endpoint.

14. The computer program product of claim 10 wherein the program code for determining the likelihood of use on the target computer for each of the plurality of file resources further comprises program code for determining the likelihood of use of the at least one file resource on the target computer based on at least one factor from a group of factors consisting of:
file resource usage patterns;
schedule based information;
user accounts;
user rights;
group information;
target computer location;
network information;
user level analysis;
user group level analysis;
file resource level analysis;
application level analysis;
target computer level analysis;
computing device level analysis; and
network level analysis.

15. The computer program product of claim 10 wherein the program code for proactively transmitting at least one file resource to the endpoint further comprises:
program code for determining a set of file resources most likely to be used on the target computer; and
program code for proactively transmitting at least a subset of the set of file resources to the endpoint, based on at least the likelihood of use of the at least one file resource, size of the at least one file resource and amount of available storage space.

16. The computer program product of claim 10 wherein the program code for proactively transmitting at least one file resource to the endpoint further comprises:
  program code for proactively transmitting at least one file resource to an endpoint, based on the likelihood of use of the at least one file resource, cost of transmitting the at least one file resource and cost of storing the at least one file resource on the endpoint.

17. The computer program product of claim 10 wherein the program code for proactively transmitting at least one file resource to the endpoint further comprises:
  program code for weighing available transmission bandwidth in determining which at least one file resource to transmit to the endpoint.

18. The computer program product of claim 10 wherein the program code for proactively transmitting at least one file resource to the endpoint further comprises program code for performing at least one step from a group of steps consisting of:
  transmitting at least one file resource to the target computer for storage in a local cache; and
  transmitting at least one file resource to a computing device other than the target computer, for access by the target computer.

* * * * *